US010248314B2

(12) United States Patent
Horvatin et al.

(10) Patent No.: US 10,248,314 B2
(45) Date of Patent: Apr. 2, 2019

(54) MIGRATE NICKNAME CACHE FOR EMAIL SYSTEMS AND DEVICES (71) Applicant: QUEST SOFTWARE INC., Aliso Viejo, CA (US)

(72) Inventors: Kevin Anthony Horvatin, Waunakee, WI (US); Steven Allen Moore, Verona, WI (US); Jonathan Cameron Obst, Madison, WI (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 403 days.

(21) Appl. No.: 14/731,278

(22) Filed: Jun. 4, 2015

(65) Prior Publication Data
US 2016/0357438 A1 Dec. 8, 2016

(51) Int. Cl.
*G06F 3/06* (2006.01)
(52) U.S. Cl.
CPC .......... *G06F 3/0604* (2013.01); *G06F 3/0647* (2013.01); *G06F 3/0683* (2013.01)
(58) Field of Classification Search
CPC .... G06F 3/0604; G06F 3/0641; G06F 3/0683; G06F 3/0647
See application file for complete search history.

(56) References Cited

U.S. PATENT DOCUMENTS

| | | | |
|---|---|---|---|
| 7,047,212 B1 * | 5/2006 | Pych | G06Q 30/02 705/27.1 |
| 7,590,696 B1 | 9/2009 | Odell et al. | |
| 7,921,292 B1 | 4/2011 | Pauker et al. | |
| 9,305,289 B2 * | 4/2016 | Roic | G06Q 10/107 |
| 2004/0088288 A1 * | 5/2004 | Pasupathy | G06F 17/30067 |
| 2004/0186861 A1 * | 9/2004 | Phatak | G06F 17/30132 |
| 2004/0243679 A1 | 12/2004 | Tyler | |
| 2005/0050547 A1 * | 3/2005 | Whittle | G06F 17/30899 719/310 |
| 2006/0045124 A1 | 3/2006 | Dahlstrom et al. | |
| 2006/0168049 A1 | 7/2006 | Orozco et al. | |
| 2006/0242109 A1 * | 10/2006 | Pereira | G06F 17/276 |
| 2006/0271606 A1 * | 11/2006 | Tewksbary | G06F 17/30132 |
| 2007/0016643 A1 | 1/2007 | Boss et al. | |
| 2008/0005355 A1 | 1/2008 | Craft et al. | |

(Continued)

OTHER PUBLICATIONS

Nir Sofer, NK2Edit v1.10, Jun. 17, 2010, NirSoft, https://web.archive.org/web/20100617161401/http://www.nirsoft.net/utils/outlook_nk2_edit.html and https://web.archive.org/web/20100617164744/http://www.nirsoft.net/utils/nk2edit_menus.html, pp. 1-6.*

(Continued)

*Primary Examiner* — Jorge A Casanova
(74) *Attorney, Agent, or Firm* — Maschoff Brennan (57) ABSTRACT

A method for migrating a nickname cache via a migration manager is described. The method includes the migration manager locating where the nickname cache is stored and locating where the nickname cache is to be migrated. Once the source and target devices are located, the migration manager can generate any necessary transformations so that the data migrated from the source device to the target device is compatible. The nickname cache can then be extracted from the source device, transformed and stored into the nickname cache of the target device.

20 Claims, 3 Drawing Sheets

(56) References Cited

U.S. PATENT DOCUMENTS

| | | | |
|---|---|---|---|
| 2008/0278740 A1* | 11/2008 | Bird | G06Q 10/10 |
| | | | 358/1.15 |
| 2009/0159509 A1* | 6/2009 | Wojdyla | B07C 3/18 |
| | | | 209/584 |
| 2010/0169264 A1 | 7/2010 | O'Sullivan et al. | |
| 2010/0250682 A1 | 9/2010 | Goldberg et al. | |
| 2011/0218845 A1 | 9/2011 | Medina | |
| 2011/0276549 A1* | 11/2011 | Fathalla | G06F 17/30351 |
| | | | 707/704 |
| 2014/0089235 A1 | 3/2014 | Lynar et al. | |
| 2015/0106490 A1 | 4/2015 | Floyd et al. | |
| 2016/0344672 A1 | 11/2016 | Brisebois | |
| 2016/0357735 A1 | 12/2016 | Horvatin | |

OTHER PUBLICATIONS

Steve Wiseman, Backup and Restore Outlook 2003 Auto Complete Data, Sep. 4, 2007, IntelliAdmin, http://www.intelliadmin.com/index.php/2007/09/backup-and-restore-outlook-2003-auto-complete-data/, pp. 1-7.*

Craig et al., How can I import auto-complete email to Outlook 2011 for Mac?, Dec. 7, 2011, http://www.makeuseof.com/answers/import-autocomplete-email-outlook-2011-mac/, pp. 1-3 (Year: 2011).*

Nir Sofer, NK2Edit Command-Line Options, Jun. 17, 2010, NirSoft, https://web.archive.org/web/20100617164817/https://www.nirsoft.net/utils/nk2edit_command_line_options.html, pp. 1-3 (Year: 2010).*

U.S. Appl. No. 14/719,121 Office Action dated Jun. 30, 2017.

* cited by examiner

MIGRATE NICKNAME CACHE FOR EMAIL SYSTEMS AND DEVICES

BACKGROUND OF THE INVENTION

Field of Invention

The present invention generally relates to data migration. More specifically, the present invention relates to providing migration of the nickname cache for email systems and devices.

Description of the Related Art

Data migration can be viewed as a process for transferring data between one or more computer systems and storage devices. Data migration may be performed for several reasons including providing backup copy of the data and consolidating data over different systems and devices into one central location. Data migration may also be performed to provide information from one computer system to a new computer system so that the new computer system also has access to the migrated data.

Generally, data migration is performed through the use of a processor and corresponding data migration software run on the processor. The data migration software allows the data migration to be performed in an automated fashion. To achieve an effective data migration, the data migration software also maps between locations where the data is originally stored (e.g., a source system) and where the data will be written (e.g., a target system). The data migration software further evaluates the format of the data being extracted from its original storage location (e.g., the source system) and a requested format of the data corresponding to the location where the data will be written to (e.g., the target system).

Many mail clients (e.g., Microsoft Outlook, Yahoo) include a nickname cache. For example, with Microsoft Outlook, the nickname cache is also known as the 'autocomplete stream'. With Microsoft Outlook, the autocomplete stream persists an autocomplete list that displays a list of names in the "to", "cc" and "bcc" boxes while a user is composing an email. Generally, the list of names of the autocomplete list contains the names of frequent contacts that the user communicates on a regular basis. The list allows the user to input names on the list without the need to type out the entire email address of the recipient. For example, user may be capable of typing a portion of the e-mail address and then be prompted with choices as to what email address the partial entry corresponds to. In other examples, the user may be capable of inputting part of or the entire name of the recipient. The nickname cache can then associate the inputted name with the corresponding email address. This correlation can be helpful when the email address associated with a particular recipient is not intuitive or complex.

Normally the nickname cache is not migrated during the process of data migration of corresponding emails. Data migration generally migrates the PST data (e.g., personal storage tables) associated with the email application. The nickname cache is a temporary object stored, for example, on the computing device associated with the email application being used (e.g., Outlook). When migrating from one device to another, the user would typically have to generate a new nickname cache for the new device.

SUMMARY OF THE CLAIMED INVENTION

A method for migrating a nickname cache via a Migration Manager is claimed. The method includes the Migration Manager locating where the nickname cache is stored and locating where the nickname cache is to be migrated. Once the source and target devices are located, the Migration Manager can generate any necessary transformations so that the data migrated from the source device to the target device is compatible. The nickname cache can then be extracted from the source device, transformed and stored into the nickname cache of the target device.

A system for migrating a nickname cache via a Migration Manager is also claimed. The Migration Manager locates where the nickname cache is stored and locating where the nickname cache is to be migrated. Once the source and target devices are located, the Migration Manager can generate any necessary transformations so that the data migrated from the source device to the target device is compatible. The nickname cache can then be extracted from the source device, transformed and stored into the nickname cache of the target device.

DETAILED DESCRIPTION

The systems and methods described herein are directed towards data migration over a network. More specifically, the systems and methods are directed towards a Migration Manager that is directed at migrating the nickname cache from a source to the target. Generally, the nickname cache is not migrated during data migration. Embodiments of the present invention provide that the nickname cache is identified during data migration, extracted from the source, transformed, and migrated to the target. The source and target may be different systems, clients, vendors and devices. In this way, a user can maintain use of the nickname cache of the source on the target post data-migration.

Figure 1:
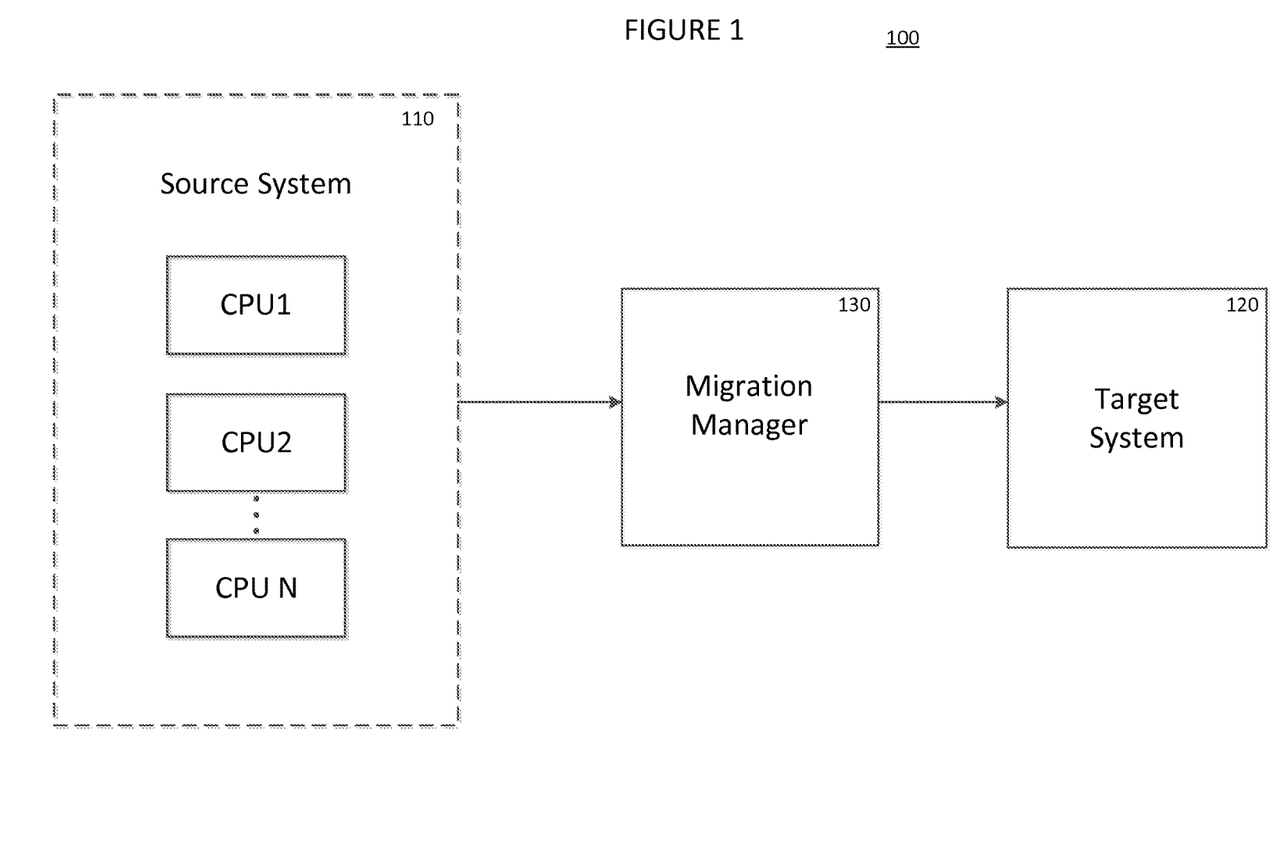
FIG. 1 illustrates a system for data migration between various computing devices and storage using the Migration Manager.

FIG. 1 illustrates a system 100 for data migration between a source system 110 and a target system 120. The source system 110 may include one or more sources, such as computing devices (e.g., laptop, desktop, mobile device). The source system 110 may have various types of data stored locally in memory associated with each computing device. For example, the data (e.g., nickname cache, PST data) may be associated with an application (e.g., e-mail) stored on the computing device. The data stored in the source system 110 can be selected for migration from the source system 110 to the target system 120. In some cases, the data migration may occur at a pre-scheduled day and time to ensure that the data is available and not in use (e.g., after business hours).

The target system 120 may be a storage device or server. The target system 120 can be used to store the data being migrated from the source system 110. Data migration may be performed for a variety of reasons. In some cases, data from the source system 110 may be stored on the target system 120 in order to provide a back-up copy of the data. The data can also be stored on the target system 120 in order to have all of a particular set of data in one common location.

In some embodiments, the target system 120 can also be another computing device. For example, a user may wish to migrate data stored in one computing device to another computing device (e.g., the target system 120). In this way, the data that was migration can also be used with the other computing device that was the target of the data migration. Embodiments of the present invention may allow the nickname cache to be migrated from one device (associated with an email system) to a different device (associated with a second email system). In any case, the nickname cache is useable on the different device even if the devices and/or the email system are different from each other.

The system 100 performs the data migration between the source system 110 and the target system 120 by using a Migration Manager 130. As described herein, the Migration Manager can be viewed as a collection of different functionalities that all facilitate data migration. The Migration Manager 130 may be implemented as a computing device that includes its own processor and memory. The Migration Manager 130 can carry out scheduled data migrations based on instructions stored in memory of the Migration Manager 130. These instructions may include identifying the data to be migrated, from which sources the data is to be migrated, and the time when the data migration is to occur. In other embodiments, an administrator (e.g., an individual responsible for managing and operating the Migration Manager 130) may customize the characteristics of a data migration being carried out by the Migration Manager 130. In other words, the administrator is capable of inputting information identifying the data to be migrated, where the data may be located, and when the data migration should be performed. Further details for the various features and functionalities of the Migration Manager 130 are provided below.

As noted above, scheduling data migration may be customized to ensure that a particular source in the source system and/or data to be extracted is not currently being used. For example, the scheduling may be structured after work hours when the source system and/or data are less likely to be in use. In some situations, an administrator in charge of the data migration may request from various users a period of time to perform data migration where one or more source systems and/or data will not be in use. By ensuring that either the source system and/or data is not being used during the performance of the data migration, the Migration Manager (or administrator) can lessen the likelihood that the data during migration becomes corrupted. In some cases, if the source system and/or data is in use, data migration for that particular source system and/or data may not be possible. The Migration Manager may then be instructed to reschedule the data migration for a different period of time whereby the source system and/or data is not in use.

The Migration Manager may also be capable of rescheduling a data migration for other reasons as well. For example, a network used to carry out the scheduled data migration may be down or performing at a sub-par level (e.g., network is busy with other concurrent processes). The Migration Manager may be capable of evaluating the network performance in order to determine if it would be appropriate to continue with the scheduled data migration or reschedule it for a later time when the network performance may be improved (e.g., the network is fixed).

It should be noted that data migration may be performed with numerous different users simultaneously. The Migration Manager can obtain information from the various different users for available periods of time when data migration can be performed. The Migration Manager can schedule groups of users based on similar periods of time where data migration may be performed. It can be difficult for an administrator to manually communicate with and determine when each individual user is available and subsequently instruct the Migration Manager to perform the data migration that satisfies the time constraints for all the users in question. The Migration Manager can be instructed to obtain this information from the user in an automated fashion and subsequently schedule the data migrations based on the responses from the various users.

Figure 2:
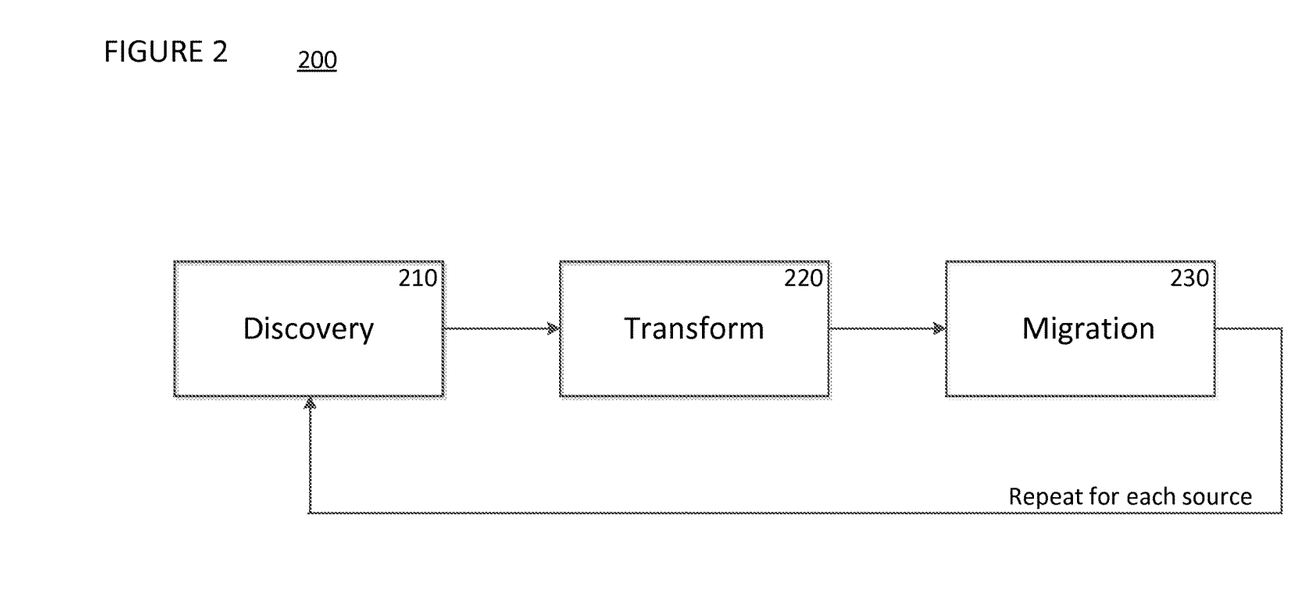
FIG. 2 illustrates a flowchart describing steps performed during data migration.

FIG. 2 illustrates a flowchart 200 describing exemplary steps performed during data migration. As noted above, data migration between the source system and the target system is performed by the Migration Manager.

Generally, the Migration Manager performs steps that fall under three broad classifications. First, the Migration Manager is instructed to discover the sets of data from one or more source systems to be migrated in step 210. This may include determining what data needs to be migrated and where the data is stored. The Migration Manager may be informed about such details (e.g., administrator identifies particular sets of data or users to migrate data from). Second, the Migration Manager provides transformations. In particular, the transformations are used to format the data extracted from the source system to fit the format of the target system in step 220. Third, the Migration Manager extracts and subsequently writes the source data into the target system in step 230. The Migration Manager, during the data migration, may use any applicable transformation derived in step 220.

It should be noted that the flowchart 200 illustrates one embodiment of the present invention. Within each step 210-230, there may be additional steps as described herein.

With respect to step 210, the Migration Manager may be instructed to locate a particular set of data stored in one or more source systems to be migrated to the target system. As indicated above, the Migration Manager may be provided information identifying what data is to be migrated and where the data might be found (e.g., user names and corresponding computing devices). The Migration Manager can then perform searches of all possible locations in the source system for the specified data to be migrated.

For example, data migrations may be directed towards migrating PSTs (i.e. personal storage tables). Generally, PSTs correspond to a file format (.pst) associated with Microsoft software (e.g., Microsoft Exchange Client, Windows Messaging, and Microsoft Outlook). The PSTs are used to store and archive copies of data (e.g., messages, calendar events) locally on a computer from which a user is utilizing the associated Microsoft software. Data migrations may also be directed towards locating the nickname cache stored in the source system.

Although details will be provided towards an embodiment directed towards data migration of the nickname cache, it should be known in the art to apply the present application to other types of data that can be subject to data migration as well. The Migration Manager is capable of receiving and carrying out discovery of various types of data stored in the source system that one might want migrated to the target system.

In a possible scenario, a business may want to migrate data related to work email of all employees to the target system (e.g., Microsoft Office 365). As noted above, the data may be migrated in order to provide a backup copy for situations where the data could be lost (e.g., computing device failure) or to provide a centralized location where the PST data can be accessed from. In order to extract and store the PST data to the target system, the location where the PST data is stored needs to be identified.

In another scenario, a user may want to migrate the nickname cache information (as well as other data related to email) from one device (e.g., target system) to another device (e.g., source system). In this way, the user can utilize the nickname cache and have available the data originally stored at the source system at the target system. Similar to the PST data described above, the location where the nickname cache data is stored needs to be identified.

To determine where the data to be migrated (e.g., PST data, nickname cache) is stored, the Migration Manager may first scan an Active Directory to identify applicable users. The Active Directory may be a list of users associated with a particular entity that is performing the data migration. For example, a business may have an Active Directory that includes the names of all the employees who work for the business. The Migration Manager can use the Active Directory to identify the employees who are subject to the data migration. If the Migration Manager is instructed to perform migration of data for only a subset of employees (e.g., particular department), the Active Directory can also be used to identify the particular subset of employees. In other embodiments, the Migration Manager may be provided the identities of the employees who the data migration may be performed for. For example, an administrator may indicate that John Doe's PST data should be migrated to the target system.

The Migration Manager also determines where the data for the identified employees is stored. By using the Active Directory to identify the set of applicable employees, the Migration Manager can then identify the various sources where the data to be migrated may be stored. For example, the Migration Manager may look for associated computing devices associated with each employee. These computing devices (e.g., desktop, laptop, mobile device) may be assigned to each employee for work-related functions. The Migration Manager can utilize the network of the business to determine which computing devices are available. Some computing device may be connected directly to the network associated with the business. In situations where an employee is working remotely, the working device may indirectly connect (e.g., Virtual Private Network) to the network associated with the business. In any case, the Migration Manager can search for the corresponding computing devices assigned to each employee so long as the computing device is somehow connected to the same business network. In scenarios where a computing device is known to exist for a particular employee but cannot be found, the Migration Manager may search for the computing device continually or at regular intervals until a period of time has elapsed.

Once the computing device has been located, the Migration Manager can then search the memory of each computing devices for the requested data to be migrated. With respect to the embodiment discussed above, the Migration Manager searches the memory of each computing device for the nickname cache. In other embodiments, the Migration Manager may also be instructed to look for PST data or other types of data also stored in the computing devices denoted as the source.

In other embodiments, the user can provide the identity of the source system to the Migration Manager. For example, the user may want to migrate the nickname cache associated with an email application on the desktop of the user to be usable with the email application on the mobile device of the user. In this case, the user can provide information to the Migration Manager identifying the desktop so that the Migration Manager can then search the identified computing device for the data to be migrated.

The discovery step 210 can be performed for each employee found on the Active Directory for which data migration is scheduled to be performed for. The number of employees in which discovery is performed for may vary based on the need of the business. In fact, the Migration Manager is capable of customization including identifying who the data migration is performed for and what set of data is being migrated. As noted above, the customization may be controlled by an administrator (e.g., an individual associated with the business tasked with managing and operating the Migration Manager).

Step 220 involves the Migration Manager providing a transformation that can be used during data migration. Generally, the Migration Manager evaluates the format of the data from the source system and the format requirements for the target system. In some situations, the format for the data stored in the source system and the format requirements for data to be stored in the target system are distinct. Therefore, to complete the data migration, the Migration Manager may need to provide transformations for source data from its original format into a format that is accepted by the target system. This transformation process involves obtaining proprietary information regarding data formats used by the source system and the target system. The information can then be used to provide a mapping or conversions between the two formats. These derived transformations in step 220 are later used during the actual migration of the data in step 230 below. These derived transformations may be stored in memory associated with the Migration Manager for future use with a particular source system-target system pairing.

In step 230, the data migration is performed by the Migration Manager. Generally, the Migration Manager extracts the particular data from the source system. The Migration Manager can first temporarily store the extracted data in memory associated with the Migration Manager. The Migration Manager can then perform any necessary transformations (derived above in step 220) related to the formatting of the extracted data to ensure that the data can be compatible when written into the target system. After the transformation has been performed on the data, the data is written into the target system. The extracted data that was temporarily stored in the Migration Manager can then be deleted to make room for additional data migrations.

In the embodiment described above, the PST data can be migrated from one or more sources to Microsoft Office 365, which is a hosted email server. As indicated above, data migration may be performed for various reasons including backing up the data (e.g., PST data). The PST data from the various source systems can also be all accumulated into one central location. The use of Microsoft Office 365 can also allow users to access their PST data remotely.

In an embodiment of the present invention, the nickname cache can be migrated from the source system to the target system (e.g., another computing device owned by the user). The nickname cache may be stored on the target system so that the user can utilize the nickname cache at the target system as well. If the target system does not have a generated nickname cache yet, the Migration Manager may instruct the target system to generate a nickname cache whereby the Migration Manager can then store the nickname cache data within the generated nickname cache. If the target system already has an established nickname cache, the Migration Manager may evaluate what data is already stored in the nickname cache and store only the unique entries migrated from the source system. It may be beneficial to have the Migration Manager limit an amount of duplicate information that is migrated and stored into the nickname cache.

With reference back to FIG. 1, an embodiment illustrating a system 100 where the Migration Manager 130 migrates the nickname cache from a source system 110 to the target system 120 can be seen. As noted above, nickname cache may generally not be migrated from the source system 110 to the target system 120. There are uses, however, for the information stored in the nickname cache. Therefore, embodiments of the present invention may include locating, extracting, transforming and migrating the nickname cache from the source to the target.

As illustrated in the figure, the Migration Manager 130 may be communicatively connected with a number of computing devices (e.g., desktop, mobile device) associated with the source system 110. These computing devices may all be associated with the same or different networks. The network may be associated with an entity (e.g., company) where each of the users of the computing devices is employed at. The network may have known properties/capabilities related to processes performed on the network (e.g., bandwidth, speed).

Each of the computing devices associated with the source system 110 may contain information (e.g., the nickname cache) that can be migrated to the target system 120 through the use of the Migration Manager 130. In an embodiment, the target source 120 may be a server used to store the nickname cache. In other embodiments, the target source 120 may be another computing device where the user would like to have the nickname cache from one source be migrated to.

Data migration can be performed to migrate data (or sub-sets of data) stored in a particular source 110 to the target source 120. Before data migration can be performed, however the Migration Manager 130 may need to schedule performance of the data migration.

The scheduling of the data migration for a source 110 can be performed in a variety of different ways. As noted above, the Migration Manager (and/or administrator) may be capable of contacting the various users associated with the possible sources 110 in advance in order to figure out when data migration can be performed. By figuring out when a source is in use and/or not in use, the Migration Manager (and/or administrator) can schedule the data migration to occur accordingly. Since data migration may involve a large number of possible sources, however, the above method may not be efficient or even possible. For example, there may be hundreds of possible sources associated with a single business spanning multiple offices over different time zones. Furthermore, there is a possibility that unforeseen changes associated with the user regarding when the possible source and/or data may be used can also change. For example, the user may forget that the data migration may have been scheduled for a particular time. There may also be work-related reasons that require the user to use the possible source and/or data during a time that was previously scheduled for data migration. In any case, it may be difficult or even impossible (based on the prior art) that a Migration Manager can 1) schedule data migration for a plurality of different possible sources and/or data and 2) ensure that the data migration can be performed.

In another embodiment, a user associated with the source may be capable of directly instructing the Migration Manager 130 to perform the data migration at a set time. If a user directly instructs the Migration Manager 130 to start data migration of the data (e.g., nickname cache) from a source system 110 to the target system 120, it can be presumed that the data and/or source system 110 is not currently being used. In any case, the Migration Manager 130 may notify the user of the impending data migration and advise the user to refrain from using the data and/or source system 110 while the data migration occurs.

Figure 3:
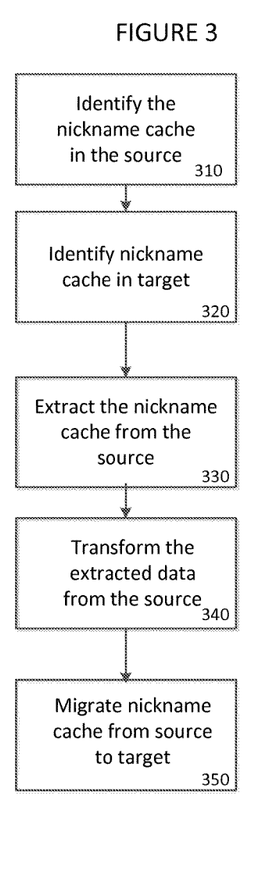
FIG. 3 illustrates a flowchart describing steps performed for migrating the nickname cache.

FIG. 3 illustrates a flowchart describing steps performed for migrating the nickname cache. As noted above, embodiments of the present invention may include locating, extracting, transforming, and migrating the nickname cache since the nickname cache is generally not migrated during a typical data migration.

In step 310, the Migration Manager attempts to identify the nickname cache to be migrated. The Migration Manager may be provided information pertaining to where the nickname cache is located, for example, by the administrator or by the user. In an embodiment, the user may wish to migrate the nickname cache associated with a first device (e.g., source system) to a second device (e.g., target system). The nickname cache can then be used by the user to facilitate in identifying the frequently contacted users that was previously generated on the first device. Without the migration, the second device would need to generate its own nickname cache based on the user activity associated, for example, with the message application (e.g., Outlook) on the second device.

To facilitate the migration, the user may inform the Migration Manager the identity of the first device. It should be noted that the Migration Manager may also be capable of obtaining the identity from the first device based on the request provided by the user (e.g., IP address). In an embodiment, the request for data migration of the nickname cache may be initiated through a graphical user interface (GUI) stored on the first device. If the first device, second device and the Migration Manager are all connected to the same network (or the Internet), the Migration Manager can then respond to the data migration request from the GUI coming from the first device. The response includes the Migration Manager obtaining the identity of where the nickname cache may be located within the first device (e.g., source system) associated with the user.

In step 320, the Migration Manager attempts to identify where the nickname cache would be migrated to. In the embodiment described above, the user may wish to migrate the nickname cache from the first device (e.g., source system) to the second device (e.g., target system). The identity of the second device can be provided, for example, by the user via the GUI.

Once the identity of the target system is obtained, the Migration Manager can then search for any existing nickname caches already generated in the target system. If a nickname cache does not exist on the target system, the Migration Manager may instruct the target system to generate a nickname cache. If a nickname cache does exist on the target system, the Migration Manager may evaluate what data is already stored in the nickname cache. In this way, the Migration Manager can later determine if any duplicate entries exist between the source system and the target system. It may be desired that duplicate entries are not extracted and migrated from the source system to the target system. Alternatively, all the data from the nickname cache may be extracted from the source system but may not be necessarily migrated to the nickname cache of the target system. In some embodiments, duplicate entries found on the target system may be overwritten or updated. In some embodiments, the duplicate entries from the source system may be ignored. The particular action taken with respect to the duplicate entries may be based, for example, on whether a particular entry found in the source system or in the target system is more recent.

Once the source system and the target system have been identified, the Migration Manager can then evaluate the formats in which the data is stored. It is possible that the source system and the target system are distinct systems, clients, vendors or devices. Therefore, a compatibility concern needs to be addressed to ensure that the data being migrated from the source system is compatible with how the data is stored in the target system. The Migration Manager is capable of evaluating the formats of each of the source system and the target system in order to generate a transformation that can be applied to the source system data. The transformation maps the format of the data from the source system into a compatible format that is recognized by the target system.

In step 330, the data stored in the nickname cache of the source system is extracted and temporarily stored into the Migration Manager. The data, once migrated, will then be deleted to make room for future data migrations.

In step 340, the Migration Manager applies the transformation to the extract data from the source system. The nickname cache, depending on the systems, clients, vendors or devices where it was originally stored (e.g., source system) and where it will be migrated to (e.g., target system), may possess different formats. As indicated above, the transformation is used so that the nickname cache migrated from the source system can be recognizable/compatible to the target system.

Once the transformation is applied to the extracted data of the nickname cache from the source system, the Migration Manager can proceed with migrating the data to the target system in step 350. Once again, the Migration Manager can evaluate what data is being migrated from the source system in order to determine if any duplicate entries are being migrated from one nickname cache (associated with the source system) to the other nickname cache (associated with the target system). The duplicate entries may be ignored or disregarded in order to minimize an overall number of entries stored in the nickname cache of the target system. The duplicate entries migrating from the source system may also be evaluated with the existing entries in the target system to determine which entry is more recent. The particular entry already existing in the nickname cache in the target system can then be modified (if the data from the source system is more current) or maintained (if the data from the target system is more current).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method to migrate a nickname cache via a migration manager, the method comprising:
    in the course of a data migration operation, locating a nickname cache to be migrated, wherein the nickname cache is stored in a source device;
    determining that the nickname cache is not in use;
    locating a target device where the nickname cache is to be migrated via a network;
    generating a transformation, wherein the transformation maps a first data format associated with the source device with a second data format associated with the target device;
    responsive to a determination that the nickname cache is not in use, extracting data associated with the nickname cache from the source device in the first data format;
    transforming the extracted data from the source device in the first data format to the second data format that is compatible with the target device; and
    migrating, via the network, the extracted data from the nickname cache of the source device to the nickname cache of the target device.

2. The method of claim 1, wherein locating the nickname cache to be migrated is based on input from a user associated with the source device, wherein the user input provides an identity of the source device to the migration manager.

3. The method of claim 1, wherein locating the target device where the nickname cache is to be migrated to is based on input from a user, wherein the user input provides an identity of the target device to the migration manager.

4. The method of claim 1, further comprising identifying that the target device does not already has a nickname cache.

5. The method of claim 4, further comprising instructing the target device to generate a nickname cache.

6. The method of claim 4, further comprising evaluating the nickname cache associated with the target device, wherein the evaluation results in identifying a list of entries already stored in the nickname cache of the target device.

7. The method of claim 1, wherein migrating the extracted data from the source device to the target device comprises comparing entries associated with the nickname cache of the source device with entries associated with a nickname cache of the target device to identify one or more duplicate entries.

8. The method of claim 7, further comprising ignoring the duplicate entries found in both the nickname cache of the source device and the nickname cache of the target device.

9. The method of claim 7, further comprising modifying the duplicate entries found in the nickname cache of the target device based on which of the duplicate entries found in both the nickname cache of the source device and the target device is more current.

10. A system to migrate a nickname cache via a migration manager, the system comprising:
    a source device comprising a nickname cache to be migrated;
    a target device where the nickname cache is to be migrated; and
    a migration manager, the migration manager including a processor that is operable to execute instructions stored in memory to cause the system to perform operations comprising:
        in the course of a data migration operation, locate the nickname cache to be migrated;
        determine that the nickname cache is not in use;
        locate the target device where the nickname cache is to be migrated via a network;
        generate a transformation, wherein the transformation maps a first data format associated with the source device with a second data format associated with the target device;
        responsive to a determination that the nickname cache is not in use, extract data associated with the nickname cache from the source device in the first data format;

transform the extracted data from the source device in the first data format to the second data format that is compatible with the target device; and migrate, via the network, the extracted data from the nickname cache of the source device to the nickname cache of the target device.

11. The system of claim 10, wherein the migration manager locates the nickname cache to be migrated based on input from a user associated with the source device, wherein the user input provides an identity of the source device to the migration manager.

12. The system of claim 10, wherein the migration manager locates the target device where the nickname cache is to be migrated based on input from a user, wherein the user input provides an identity of the target device to the migration manager.

13. The system of claim 10, wherein the migration manager further identifies whether the target device already has a nickname cache.

14. The system of claim 13, wherein the migration manager further instructs the target device to generate a nickname cache when the target device does not already have a nickname cache.

15. The system of claim 13, wherein the migration manager further evaluates the nickname cache associated with the target device, wherein the evaluation results in identifying a list of entries already stored in the nickname cache of the target device.

16. The system of claim 10, wherein the migration manager migrates the extracted data from the source device to the target device by comparing entries associated with the nickname cache of the source device with entries associated with the nickname cache of the target device to identify one or more duplicate entries.

17. The system of claim 16, wherein the migration manager ignores the duplicate entries found in both the nickname cache of the source device and the nickname cache of the target device.

18. The system of claim 16, wherein the migration manager modifies the duplicate entries found in the nickname cache of the target device based on which of the duplicate entries found in both the nickname cache of the source device and the target device is more current.

19. A non-transitory computer-readable storage medium, having embodied thereon instructions executable by a processor to cause a system to perform operations comprising:

in the course of a data migration operation, locating a nickname cache to be migrated, wherein the nickname cache is stored in a source device;

determining that the nickname cache is not in use;

locating a target device where the nickname cache is to be migrated via a network;

generating a transformation, wherein the transformation maps a first data format associated with the source device with a second data format associated with the target device;

responsive to a determination that the nickname cache is not in use, extracting data associated with the nickname cache from the source device in the first data format;

transforming the extracted data from the source device in the first data format to the second data format that is compatible with the target device; and migrating, via the network, the extracted data from the nickname cache of the source device to the nickname cache of the target device.

20. The non-transitory computer-readable storage medium of claim 19, wherein migrating the extracted data from the source device to the target device comprises comparing entries associated with the nickname cache of the source device with entries associated with a nickname cache of the target device to identify one or more duplicate entries.

* * * * *